United States Patent [19]
Ostrovsky

[11] Patent Number: 6,091,850
[45] Date of Patent: Jul. 18, 2000

[54] METHOD OF COMPRESSING AND DECOMPRESSING GRAPHIC IMAGES

[75] Inventor: Alex Ostrovsky, San Francisco, Calif.

[73] Assignee: Fujitsu Microelectronics, Inc., San Jose, Calif.

[21] Appl. No.: 09/160,504

[22] Filed: Sep. 24, 1998

Related U.S. Application Data

[63] Continuation of application No. 08/846,549, Apr. 30, 1997.
[51] Int. Cl.[7] .................. G06K 9/36; G09G 5/00
[52] U.S. Cl. .................. 382/166; 382/232; 345/202
[58] Field of Search .................. 382/182, 166, 382/167, 232, 233, 239, 244–247, 253; 348/403, 417, 420, 422; 345/185–203, 155

[56] References Cited

U.S. PATENT DOCUMENTS

| | | | |
|---|---|---|---|
| 4,020,502 | 4/1977 | Hayami et al. | 358/80 |
| 4,941,193 | 7/1990 | Barnsley et al. | 382/232 |
| 4,965,754 | 10/1990 | Stansfield et al. | 364/526 |
| 5,046,119 | 9/1991 | Hoffert et al. | 382/232 |
| 5,047,853 | 9/1991 | Hoffert et al. | 358/133 |
| 5,164,819 | 11/1992 | Music | 358/13 |
| 5,204,738 | 4/1993 | Aragaki | 358/75 |
| 5,253,078 | 10/1993 | Balkanski et al. | 358/426 |
| 5,319,793 | 6/1994 | Hancock et al. | 395/800 |
| 5,377,018 | 12/1994 | Rafferty | 358/433 |
| 5,408,542 | 4/1995 | Callahan | 382/232 |
| 5,420,608 | 5/1995 | Choi et al. | 345/186 |
| 5,424,755 | 6/1995 | Lucas et al. | 345/155 |
| 5,453,787 | 9/1995 | Hancock et al. | 348/391 |
| 5,467,134 | 11/1995 | Laney et al. | 348/409 |
| 5,510,838 | 4/1996 | Yomdin et al. | 348/384 |
| 5,585,944 | 12/1996 | Rodriguez | 358/500 |
| 5,588,069 | 12/1996 | Katayama et al. | 382/166 |

Primary Examiner—Jose L. Couso
Assistant Examiner—Duy M. Dang
Attorney, Agent, or Firm—Christie, Parker & Hale, LLP

[57] ABSTRACT

A method of compressing and decompressing graphics images. The compression method operates on uncompressed bitmap image data to generate a compressed representation of the image. To compress an image, all 8 pixel by 8 pixel blocks of the image are individually processed in sequence. For each block, all distinct colors present in the block are identified and assigned an ordinal number. Two pixel colors are deemed distinct if the difference between the colors is greater than an epsilon value. The epsilon value is a function of the total brightness of the block. A data structure for the block is generated to store the number of distinct colors present in the block, the actual RGBA quadruplet for each distinct color, and a color ordinal number of each pixel in the block representing the distinct color of the pixel. To decompress the image, the RGBA quadruplets of all pixels within each block are reconstructed from the data structure for the block.

15 Claims, 10 Drawing Sheets

FIG.2

|   | 0 | 1 | 2 | 3 | 4 | 5 | 6 | 7 |
|---|---|---|---|---|---|---|---|---|
| 0 | 3 | 1 | 3 | 3 | 4 | 4 | 4 | 4 |
| 1 | 4 | 3 | 4 | 3 | 4 | 3 | 4 | 4 |
| 2 | 3 | 3 | 3 | 3 | 3 | 3 | 3 | 3 |
| 3 | 2 | 5 | 5 | 5 | 5 | 4 | 2 | 5 |
| 4 | 2 | 2 | 2 | 2 | 2 | 4 | 4 | 4 |
| 5 | 1 | 2 | 1 | 1 | 1 | 1 | 1 | 1 |
| 6 | 2 | 2 | 1 | 1 | 1 | 1 | 3 | 3 |
| 7 | 6 | 6 | 6 | 6 | 6 | 6 | 6 | 3 |

| 1 | R1 | G1 | B1 | A1 |
|---|----|----|----|----|
| 2 | R3 | G3 | B3 | A3 |
| 3 | R6 | G6 | B6 | A6 |
| 4 | R2 | G2 | B2 | A2 |
| 5 | R4 | G4 | B4 | A4 |
| 6 | R5 | G5 | B5 | A5 |

FIG. 4

Row 1 (indices 0–39): 3 1 3 4 4 4 4 3 4 3 3 4 3 3 3 3 3 3 3 3 2 5 5 5 4 2 5 2 2 2 2 2 4 4 4 ... 37 38 39

Row 2 (indices 40–63): 1 2 1 1 1 2 2 1 1 1 1 1 3 6 6 6 6 6 6 3 ... 61 62 63

METHOD OF COMPRESSING AND DECOMPRESSING GRAPHIC IMAGES

CROSS-REFERENCE TO RELATED APPLICATIONS

This application is a continuation of U.S. application Ser. No. 08/846,549, filed on Apr. 30, 1997, now pending, the disclosure of which is herein incorporated by reference.

A portion of the disclosure of this patent document contains material which is subject to copyright protection. The copyright owner has no objection to the facsimile reproduction by any one of the patent disclosure, as it appears in the Patent and Trademark office patent files or records, but otherwise reserves all copyright rights whatsoever.

FIELD OF THE INVENTION

This invention relates generally to data compression and decompression and more specifically to a method for encoding color graphics image data according to sets of similar colors.

BACKGROUND OF THE INVENTION

Still color graphics images are widely used for display by computer systems, especially by multimedia personal computers (PCs). As the degree of resolutions provided and the number of colors capable of being represented in an image get higher, the size of the data representing the color graphics image grows larger. Also, as bigger computer monitors are used, users require the display of larger images. Reduction of the memory space needed to store color graphics images and reduction of the time needed to transmit and display such images has been, and continues to be, an important goal in computer graphics technology.

FIG. 1 is a prior art diagram of a color graphics image and its associated storage representation. A bitmap image 10 has n lines (or rows) of m pixels per line. Typically, both n and m are divisible by eight. Hence, the bitmap image 10 can be logically divided up into square blocks of 8 pixels by 8 pixels. Thus, there are m/8 blocks across the horizontal axis of the bitmap image, and n/8 blocks down the vertical axis of the bitmap image, or (m/8*n/8) 8×8 blocks in the bitmap image. A given 8×8 block can be referenced by a (i, j) pair, where i is in the range 0 to (m/8−1), and j is in the range 0 to (n/8−1).

Each 8×8 block 12 therefore contains 64 pixels. Each pixel is represented as a RGBA quadruplet 14. The RGBA quadruplet 14 includes a red color value (R) 16, a green color value (G) 18, a blue color value (B) 20, and a brightness value (A) 22. The color and brightness of the pixel are determined by the R, G, B, and A values. For most color images, an 8×8 block contains 5 to 12 different colors. Each of the R, G, B. and A values is stored in an eight-bit byte. Therefore, each pixel occupies 4 bytes of storage, and an 8×8 block occupies 256 bytes of storage. Accordingly, the bitmap image 10 requires 256*(n/8*n/8) bytes of storage. For example, if the bitmap image is 640 pixels per line by 480 lines, the size of uncompressed bitmap image data is 256*(640/8*480/8), which is 1,228,800 bytes. For a bitmap image of 1280 pixels per line by 1024 lines, the size of the uncompressed bitmap image is 256*(1280/8*1024/8), which is 5,242,880 bytes. Hence, uncompressed bitmap images require large amounts of storage.

One method of still image compression was devised by the Joint Photographic Experts Group (JPEG), a group sanctioned by the International Standards Organization (ISO). The JPEG compression standard is a lossy image compression algorithm that reduces the size of bitmapped images with little discernable image degradation. Lossy compression methods reduce the size of the image by disregarding some pictorial information. In contrast, lossless compression methods reduce the number of bits an image would normally require without losing any data. The JPEG compression algorithm converts a color image into rows of pixels, each pixel having numerical values representing brightness and color as described above. The image is broken down into blocks, each block being 16 pixels by 16 pixels, and then reduced to blocks of 8 pixels by 8 pixels by subtracting every other pixel in each block. The compression algorithm uses a formula that computes an average color value for each block, permitting it to be represented with less data. To retrieve the image data, the process is simply reversed to decompress the image.

Although widely used, the JPEG standard has disadvantages. The JPEG algorithm uses Fourier transformation, Hoffman coding, "zigzagging", and YUV transformation calculations to compute local average color values for related pixels in the image. The algorithm represents each color used in a row of pixels in the image as a curve. The local average color values are computed by calculating cosine functions and by multiplying floating point coefficients for terms of the polynomial equation representing the curve. These computations are relatively slow, negatively affecting the overall image compression and decompression speed. A faster method of compressing and decompressing color graphics images is needed which does not require floating point computation of cosine functions and multiplication operations. Furthermore, a method which provides a good compression ratio and allows for a high degree of parallelism during decompression would be a valuable addition to the computer graphics art.

SUMMARY OF THE INVENTION

An embodiment of the present invention provides a method for compressing and decompressing graphics image data. The method of compressing graphics image data into a compressed block, the graphics image data comprising a plurality of pixels, each of the plurality of pixels having a color represented by red, green, blue, and intensity values, includes the steps of mapping a color ordinal number to each pixel, each color ordinal number representing a color present in the pixels of the graphics image data; storing the red, green, blue, and intensity values of each color present in a pixel into the compressed block; and storing the color ordinal number mapped to each pixel into the compressed block.

The method of decompressing a compressed block of graphics image data into an uncompressed graphics image data includes the steps of obtaining a color ordinal number from the list of color ordinals numbers in the compressed block; obtaining the red, green, blue, and intensity values from the plurality of red, green, blue, and intensity values in the compressed block corresponding to the obtained color ordinal numbers; writing the red, green, blue, and intensity values into the uncompressed graphics image data at a location corresponding to the pixel with the obtained color ordinal number; and repeating these steps for each color ordinal number in the list.

Additional advantages and novel features of the invention will be set forth in part in the description which follows, and will become apparent to those skilled in the art upon examination of the following, or may be learned by practice of the invention.

According to another embodiment of the present invention, the foregoing and other advantages are attained by an apparatus for compressing graphics image data into a compressed block, the graphics image data comprising a plurality of pixels, each of the plurality of pixels having a color represented by red, green, blue, and intensity values. The apparatus includes means for mapping a color ordinal number to each pixel, each color ordinal number representing a color present in the pixels of the graphics image data; means for storing the red, green, blue, and intensive values of each color present into the compressed block; and means for storing the color ordinal number mapped to each pixel into the compressed block.

In another embodiment of the present invention, the foregoing and other advantages are attained by an apparatus for decompressing a compressed block of graphics image data into an uncompressed graphics image data, the uncompressed graphics image data comprising a plurality of pixels, each of the plurality of pixels having a color represented by red, green, blue, and intensity values, the compressed block comprising a plurality of color ordinal numbers representative of the color of each pixel in the uncompressed block, and a plurality of red, green, blue, and intensity values corresponding to the color ordinal numbers. The apparatus includes means for obtaining a color ordinal number from the plurality of color ordinals numbers in the compressed block; means for obtaining the red, green, blue, and intensity values in the compressed block corresponding to the obtained color ordinal number; and means for writing the red, green, blue, and intensity values into the uncompressed graphics image data at a location corresponding to the pixel with the obtained color ordinal number.

Still other objects and advantages of the present invention will become readily apparent to those skilled in the art from the following detailed description, wherein is shown and described only the preferred embodiment of the invention, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

DESCRIPTION OF THE DRAWINGS

FIG. 2 is a diagram of an example 8×8 block with the RGBA quadruplets represented as ordinal numbers according to the present invention.

FIG. 3 is a diagram illustrating the mapping of ordinal numbers to RGBA quadruplets.

FIG. 4 is the example block of FIG. 2 represented as a one-dimensional array.

DETAILED DESCRIPTION OF THE INVENTION

Figure 1:
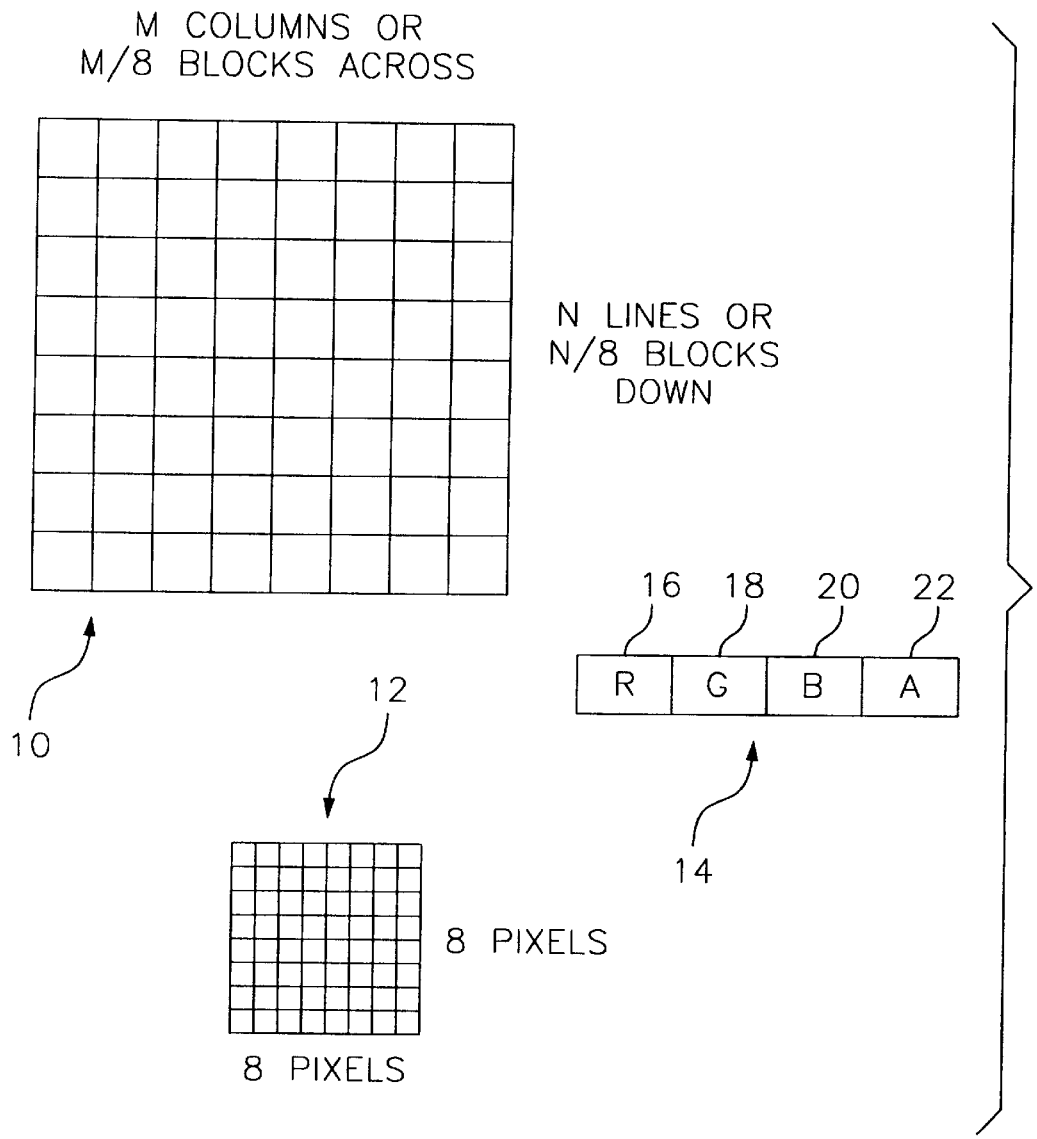
FIG. 1 is a diagram of a color graphics image and its associated storage representation (Prior Art).

The present invention operates on uncompressed bitmap image data, such as is shown in FIG. 1, to generate a compressed representation of the image. It also operates on compressed bitmap image data to generate the original, uncompressed representation. Generally, to compress an image, the present invention individually processes all blocks of 8 pixels by 8 pixels of the image in sequence. For each block, all distinct colors present in the block are identified and assigned an ordinal number. A data structure for the block is generated to store the number of distinct colors present in the block, the actual RGBA quadruplet for each distinct color, and a color ordinal number of each pixel in the block representing the distinct color of the pixel. The resulting data structure requires significantly less storage than the set of original RGBA quadruplets for the block. The data structure for the block is then stored in memory or in a computer file and the next block of the image is processed. This process is repeated for all blocks of the bitmap image. To decompress the image, the RGBA quadruplets of all pixels within each block are reconstructed from the data structure for the block. This reconstruction is repeated for all blocks in the image.

The representation of the compressed image data according to the present invention may be best understood by reference to a simple example. FIG. 2 is a diagram of an example 8×8 block with the RGBA quadruplets represented as ordinal numbers. The 8×8 block 24 of FIG. 2 contains six different colors. Thus, the colors present in the 8×8 block may be represented by six different color ordinal numbers 1 through 6.

Block 24 represents one 8×8 block from a bitmap image. Block 24 may be referred to as a color ordinal table. It has indices in the horizontal direction from 0 to 7 indicating columns, and in the vertical direction from 0 to 7 indicating rows. Each pair of horizontal and vertical indices indicates a block, or pixel, having an associated color ordinal number.

Alternatively, the 8×8 block can be represented as a 64-element one-dimensional array. FIG. 4 is an illustration of such an array. As exemplified in FIG. 4, the block corresponding to the block of row 0, column 0, occupies the first location, the zeroeth index, in the array. The block corresponding to the block for row 0, column 1, occupies the second location in the array. The block for row 1, column 0, occupies the ninth location in the array. The block corresponding to the last block, row 7, column 7, occupies the 64th location, the 63rd index, in the array.

The pixels of the block are scanned to determine what distinct colors are represented in the block. Each distinct color found is assigned an ordinal number. FIG. 3 is a diagram illustrating the mapping of ordinal numbers to RGBA quadruplets. For example, ordinal number one indicates a color composed of red value R1, green value G1, blue value B1, and brightness value A1. Ordinal number two indicates a color composed of red value R3, green value G3, blue value B3, and brightness value A3. Each RGBA combination is a unique color and brightness specification for at least one pixel in the current block. The other colors found in the example block are mapped as shown in FIG. 3.

The color ordinal table is created and represented as a one-dimensional array as illustrated in FIG. 4. The one-dimensional array forms part of a data structure for the block. This data structure is also referred to as a compressed block. The compressed block uses a reduced amount of storage, and does not require cosine function evaluation or floating point coefficient multiplication operations, thereby improving processing speeds.

Figure 5:
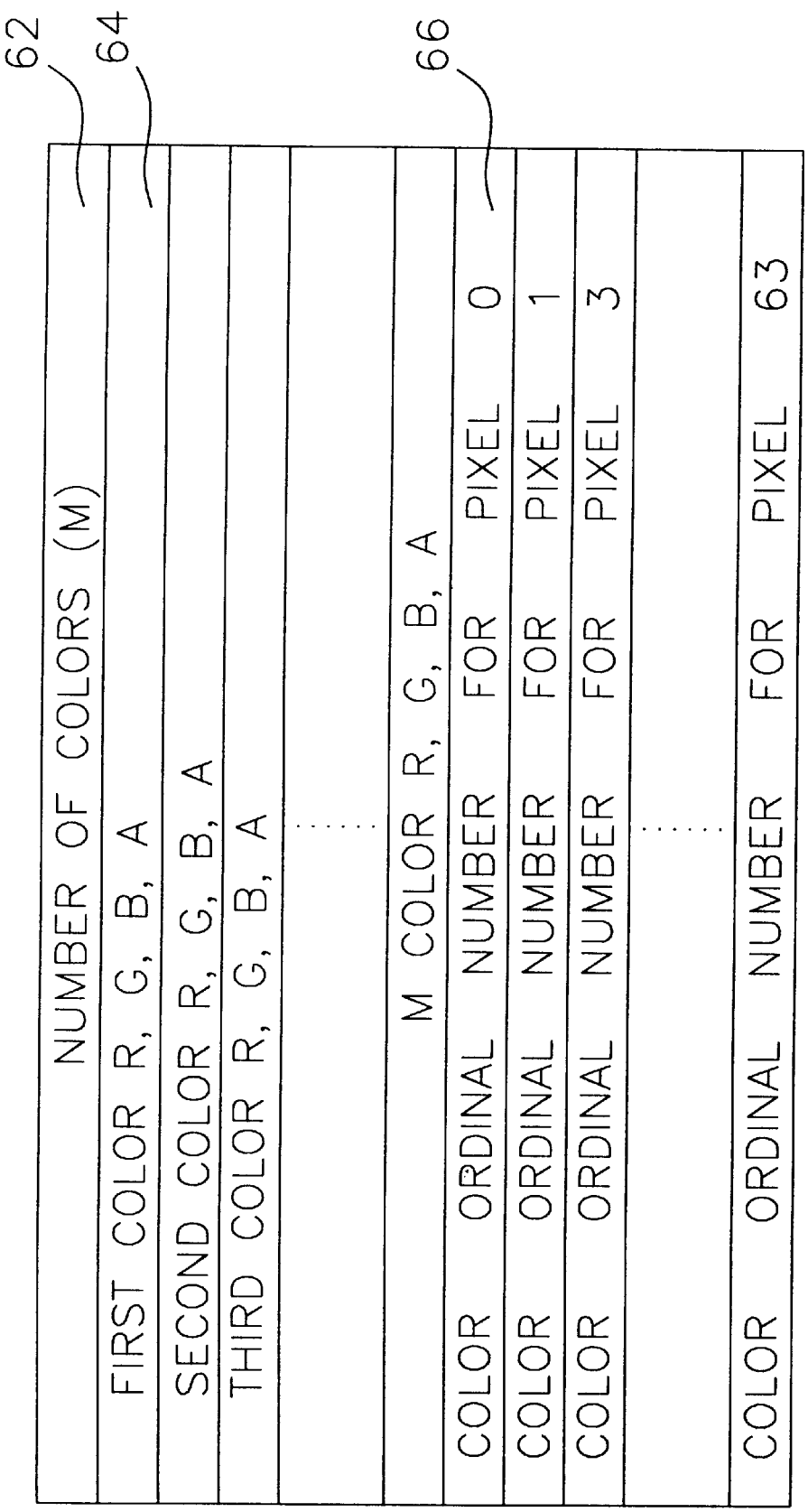
FIG. 5 is a diagram of a generalized data structure for storing a compressed block according to the present invention.

FIG. 5 is a diagram of a generalized data structure representing the compressed block. The data structure comprises fields 62–66. Field 62 represents the number of colors (M) present in the block 62. Field 62 occupies one byte of storage space. Field 64 represents the R, G, B, and A values of each color in the block. The embodiment illustrated in FIG. 5 contains M different colors. Accordingly, M different RGBA values are stored in field 64. If lossy compression is used, the number of bytes need to store the R, G, B, and A values depends on a work bit value. The work bit value represents the number of significant bits for each of the R, G, B, and A components. For example, if the work bit value equals four, only the four most significant bits of each R, G, B, and A component will be stored, for a total of two bytes storage space for all four components. In the embodiment described, the work bit value is defaulted to four. The work bit may also be set to two, six, eight, or other values.

Field 66 represents the color ordinal number of each pixel in the block. The number of bits necessary to store each color ordinal number depends on the number of colors present in the block 62. The example block 24 of FIG. 2 contains six colors. Thus, only three bits are required to store the color ordinal number for each pixel in the block. The total storage space necessary for storing the color ordinal numbers for all 64 pixels is therefore (3* 64)/8 bytes, or 24 bytes. If lossy compression with the work bit value of four is used, the total number of bytes needed to store the compressed block is 37 bytes. Given that the uncompressed block would have required 256 bytes, operation of the present invention yields a compression ratio of about 7:1 for this particular instance.

In one embodiment of the invention, if the block has only one color, then there is only one RGBA color group and the format of the data structure is {N=1, R, G, B, A}. Hence, the block can be represented with only five bytes of storage.

In another embodiment of the invention, color ordinal numbers are assigned to the pixels in the block by identifying similar sets of colors. If a selected pixel color is similar to a previous pixel color, the selected pixel is assigned the color ordinal number of the previous pixel color even if the colors are not identical. On the other hand, if the selected pixel color is distinct from previous pixel colors, a new color ordinal number representative of the distinct color is assigned.

Figure 6:
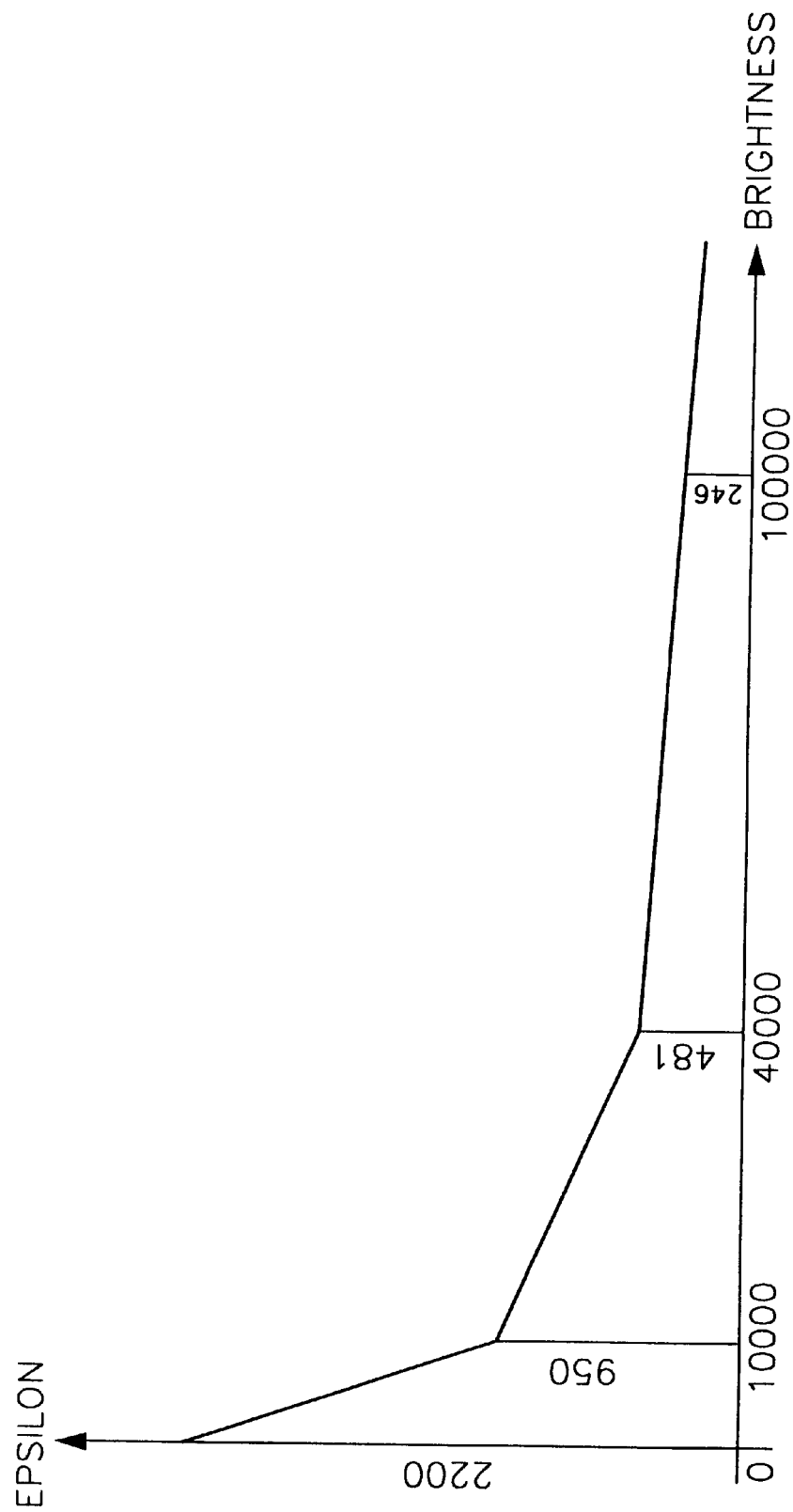
FIG. 6 is a graph representing a function for the epsilon value according to an embodiment of the present invention.

In the described embodiment, two colors are deemed distinct if the difference between any of the R,G,B values representing the colors of the pixels are greater than an epsilon value. FIG. 6 is a graph representing the function for the epsilon value according to one embodiment of the invention. As represented in FIG. 6, the epsilon value is a function of the total brightness of the block. As illustrated in FIG. 6, specifically, the epsilon value is a function of the total brightness of the block, as determined by determining the average value of each of the R,G, and B values representing the colors of the pixels present in the block, and squaring and adding each of the resultant values. Thus, in the presently described embodiment, epsilon is a function f(x), where $$x = \left(\frac{R_1 + \ldots + R_{64}}{64}\right)^2 + \left(\frac{G_1 + \ldots + G_{64}}{64}\right)^2 + \left(\frac{B_1 + \ldots + B_{64}}{64}\right)^2$$

Further, it has been found visible differences in color are more noticeable as x, an indication of the brightness of the block, increases. Accordingly, the value of epsilon decreases with an increase in x. In the presently described embodiment epsilon equals:

2200−x/8; X L1000
950−(x−10000)/64; $10000 \leq x < 40000$
481−(x−40000)/256; $40000 \leq x$.

It will be obvious to one skilled in the art, however, that the epsilon value may be a function of any attribute of the block. For example, the epsilon value may be a function of a dominant color present in the block. In one embodiment of the invention, the epsilon value equals zero when lossless compression is desired.

In another embodiment of the invention, the epsilon value is further adjusted based on a work bit value and a quality level value. The quality level value indicates a desired image quality for the block. In one embodiment of the invention, the user may select a type number which in turn determines a level number that ranges from 0 to 2, with Level 0 indicating the highest image quality. The type number selected by the user also determines the quality level value for the block. The level number determines the work bit value.

Table I illustrates the level number ("Level"), quality level value ("Fde"), and work bit value ("WorkBits") corresponding to each type number ("Type") that may be selected by the user. In the embodiment illustrated by Table I, the correspondence between the level number and work bit value is as follows:

WorkBits=8−2*Level

The value of epsilon is then further adjusted first by multiplication by the Fde value and then by division by four if workbits has a value of six, or division by 16 if workbits has a value of eight.

TABLE I

| Type = 2 | Level = 0 | Fde = 0.00 | WorkBits = 8 |
| Type = 3 | Level = 0 | Fde = 1.00 | WorkBits = 8 |
| Type = 4 | Level = 1 | Fde = 1.50 | WorkBits = 6 |
| Type = 5 | Level = 2 | Fde = 0.50 | WorkBits = 4 |
| Type = 6 | Level = 2 | Fde = 1.00 | WorkBits = 4 |
| Type = 7 | Level = 2 | Fde = 1.50 | WorkBits = 4 |

Figure 7A:
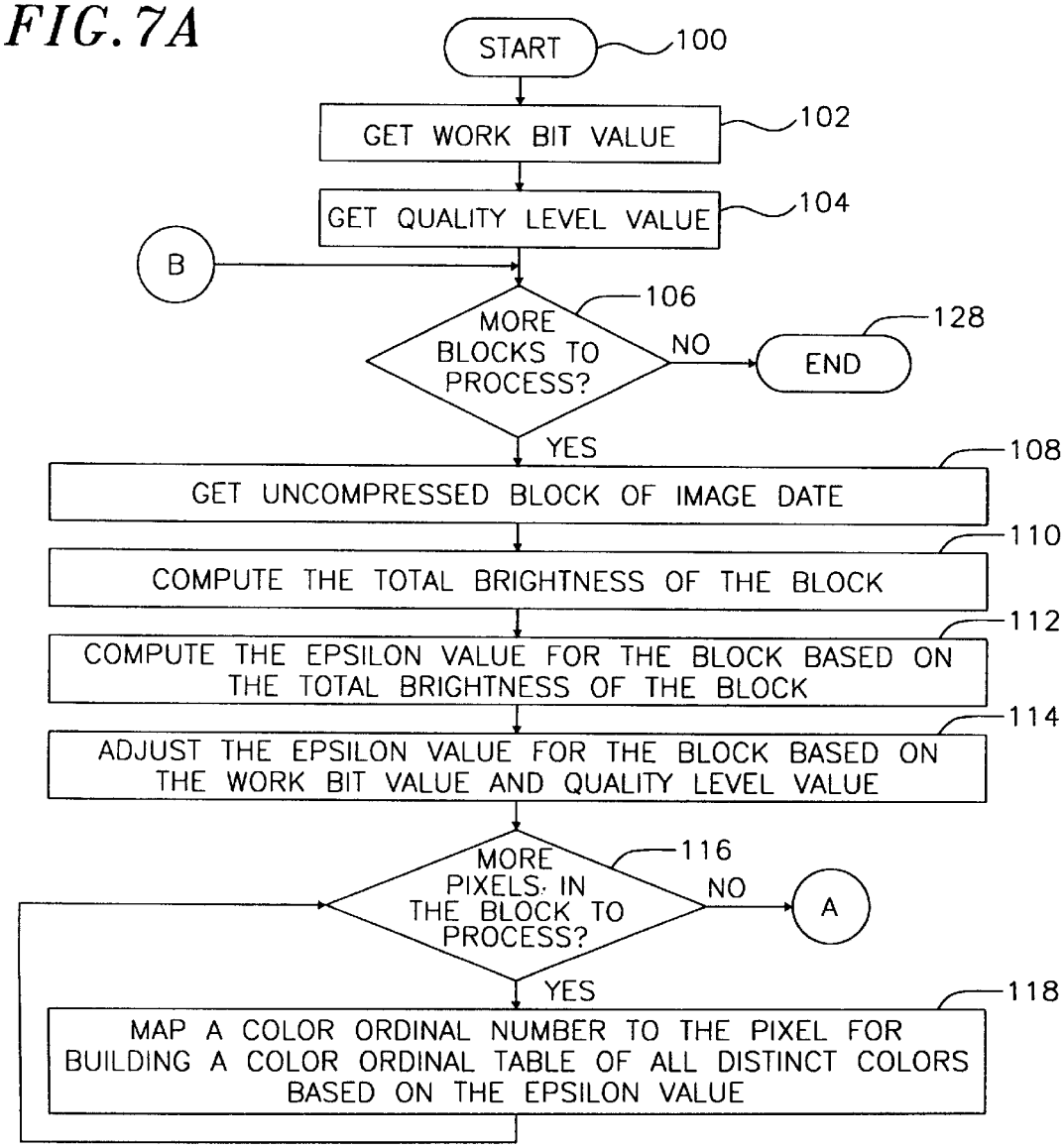
FIGS. 7A–7B are high level flow charts of the steps for compressing image data according to the present invention.
Figure 7B:
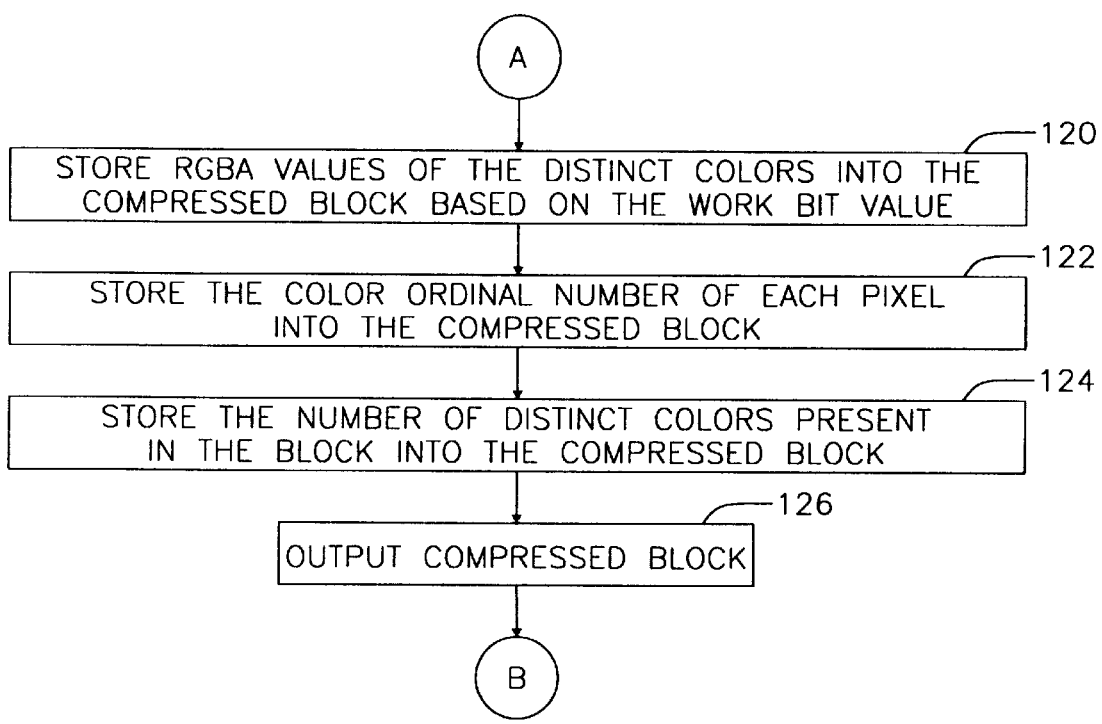

FIGS. 7A–7B illustrate flow charts of a process for compressing image data. A "C" language implementation of the compression algorithm of the present invention is disclosed in Appendix A.

The process calculates the quality level value and work bit value in steps 102 and 104, respectively. In step 106, the process determines whether all blocks of graphics image data have been processed. If there are more blocks to process, an uncompressed 8×8 block of image data is obtained for compression processing in step 108. Typically, the image data is stored on a computer memory of a computer system having a processor. The processor reads the image data from the computer memory in a sequential fashion.

In step 110, the process computes the total brightness of the block. In the described embodiment, this is accomplished by taking the average of the R, G, and B values of all the pixels in the block. The process then computes the epsilon value for the block based on the computed brightness in step 112. This epsilon value is adjusted based on the work bit value and quality level value in step 114.

In step 116, the process determines if there are more pixels in the block to process. If there are, the process maps a color ordinal number to the pixel in step 118 and adds it to the color ordinal table (similar to the example table shown in FIG. 2). Each color ordinal number represents a distinct color in the block. Two pixels are considered to be of the same color if the RGBA values of the pixels differ by less than the epsilon value. In such a case, the process assigns the same color ordinal number to both pixels. In one embodiment of the invention, the resulting color ordinal table after all the pixels in the block have been processed is represented as a 64-element one-dimensional array (as shown in FIG. 4).

After the distinct colors in the block are identified and the color ordinal table is built, the process, in step 120, extracts the RGBA values from the uncompressed block of image data and stores the RGBA values into the compressed block data structure, with the bit values representing the RGBA values modified according to the calculated work bit value. In step 122, the process scans the color ordinal table to obtain and store into the compressed block, the color ordinal number of each pixel in the block. The total number of distinct colors present in the block is also stored in the compressed block in step 124. The resulting compressed block data structure is shown in FIG. 5.

The process outputs the compressed block in step 126. Typically, this output operation entails writing the compressed block to a computer memory or file for storing the compressed image data. The process then returns to step 106 where it decides whether or not more blocks of the image data need to be processed. If the answer is NO, the END step 128 is taken and compression processing is complete for the image data.

Figure 8:
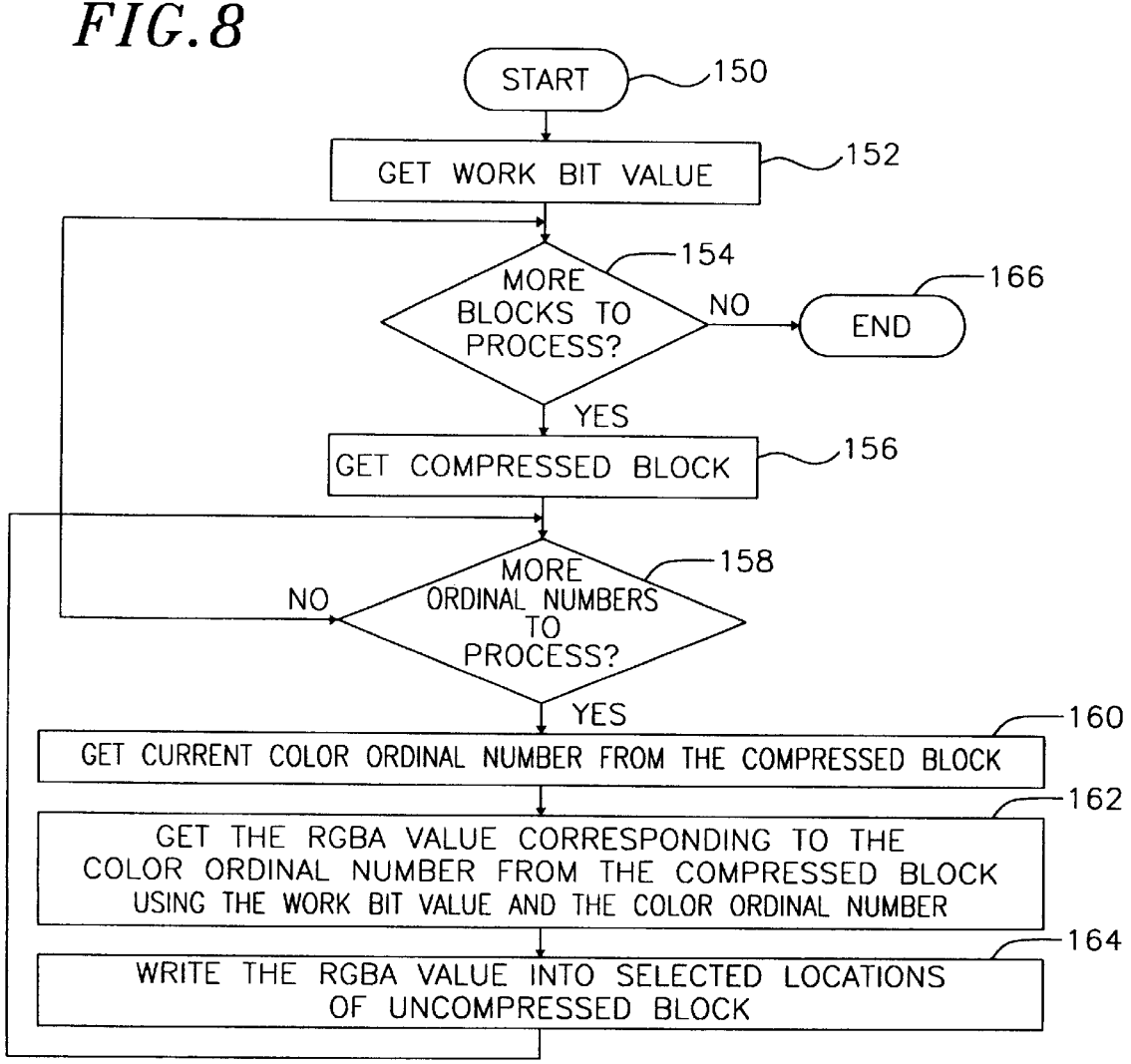
FIG. 8 is a high level flow chart of the steps for decompressing previously compressed image data according to the present invention.

FIG. 8 illustrates a flow chart of a process for decompressing previously compressed image data. A "C" language implementation of the decompression algorithm of the present invention is disclosed in Appendix B. The decompression steps are usually performed when display of a compressed image is desired. The process first obtains the work bit value that was used during compression in step 152. Next, an inquiry is made in step 154 as to whether there are more blocks to process. If there are more blocks to process, the process obtains a compressed block of image data for decompression processing at step 156. Typically, the compressed block is stored on a computer memory of a computer system having a processor. The processor reads the compressed image data from the computer memory in a sequential fashion.

The process determines in step 158 whether there are more ordinal numbers to process. If there are more ordinal to process, the process extracts the current color ordinal number from the compressed block in step 160. The process then extracts the RGBA value corresponding to the current color ordinal number from the compressed block in step 162. The location of the corresponding RGBA value in the compressed block is determined by the work bit value and the extracted color ordinal number. For example, if the color ordinal number in the described embodiment is two, the corresponding RGBA value will be stored in the third storage location of the compressed block (the first and second locations containing the number of colors and the RGBA value corresponding to color ordinal number one, respectively) (see FIG. 5). Since the storage size of each RGBA value is determined by the work bit value, the exact starting point of the third storage location can be computed.

In step 164, the process writes the RGBA values into selected locations of the uncompressed block. In the described embodiment, the first color ordinal number in the compressed block corresponds to pixel number 0, the second color ordinal number to pixel number 1, the third color ordinal number to pixel number 2, and so on. Thus, the process writes the RGBA value corresponding to the first color ordinal number to the location in the uncompressed block for pixel number 0, the RGBA value corresponding to the second color ordinal number to the location in the uncompressed block for pixel number 1, and so on, until all the color ordinal numbers for the current block have been processed. In the described embodiment, the uncompressed block is represented as a 64-element one-dimensional array. Thus, each pixel number indicates the index of the array in which to store the corresponding RGBA value.

If all blocks of the image have been processed, the process takes the NO branch in step 154 to End step 166 and decompression processing is complete.

Figure 9:
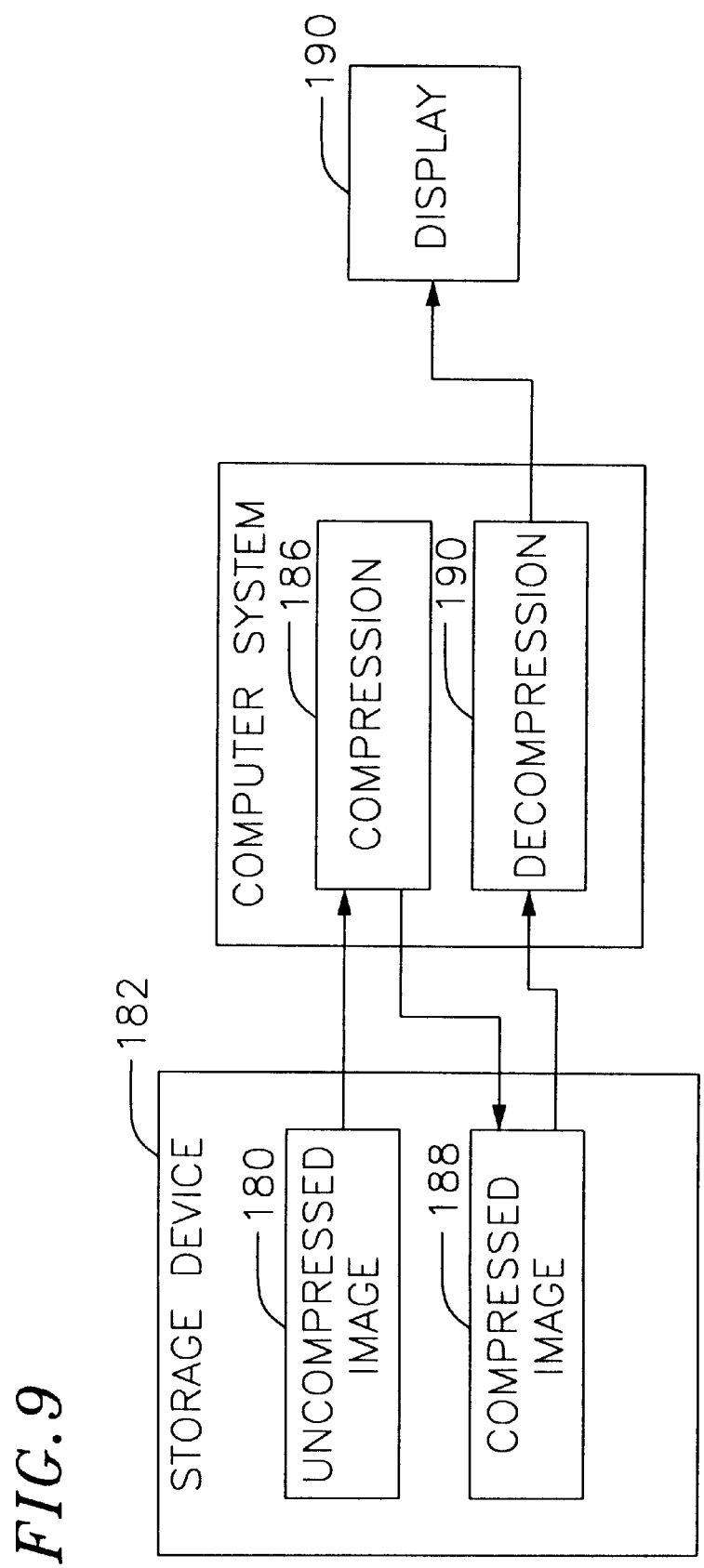
FIG. 9 is a diagram of a software embodiment of the present invention as implemented on a computer system.

A software implementation of the present invention is described above. FIG. 9 is a diagram of a software embodiment of the present invention as implemented on a computer system. An uncompressed image 180 is stored on a storage device 182 which is coupled to a computer system 184. The computer system 184 executes compression function 186 in accordance with the described embodiment to read uncompressed image 180 and compress it. The results of the compression operation are stored in compressed image 188 of storage device 182 for future use. Subsequently, the same computer system 184, or a different computer system (not shown), executes decompression function 190 in accordance with the described embodiment to read a compressed image and decompress it. The decompressed image is sent to display 192 for presentation to a user of the computer system.

Although the compression and decompression methods described above may be implemented in software executing on a general purpose computer, the present invention may also be implemented in multi-processor hardware that takes advantage of the inherent paralellism available with the present method. Although both compression and decompression are important, in practice an image is typically compressed once but decompressed many times. Therefore, speed of decompression is very important. If the decompression steps can be implemented in parallel on multiple processing devices, overall decompression time can be dramatically reduced.

Figure 10:
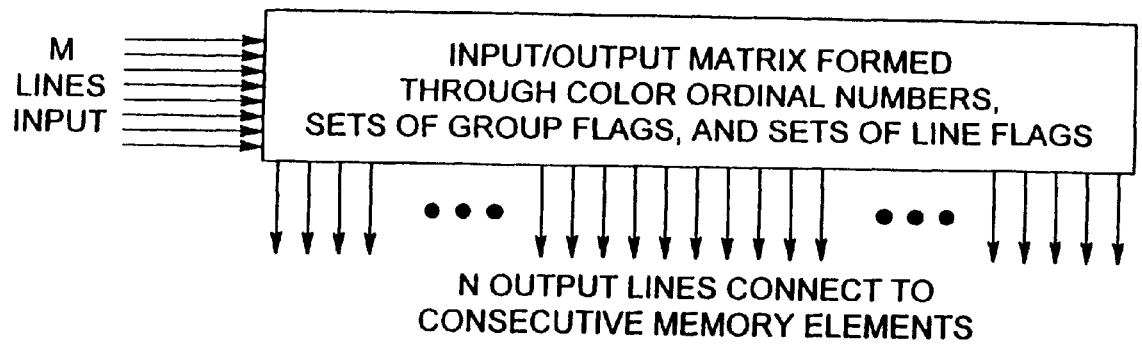
FIG. 10 is a diagram of a M*N distributor used for decompression.

In the hardware embodiment, a decompression apparatus is represented in a M*N distributor with a 32-bit wide data path. FIG. 10 is a diagram of a M*N distributor used for decompression. The number of lines input to the distributor (M) is set to eight, and the number of lines output (N) is set to 64. The output lines are connected to consecutive memory elements (not shown). The number of input lines M should correspond to the actual number of color groups in the image. However, by setting M to eight and assuming that the number of color groups in the image is greater than eight, the entire set of color groups can be divided into subsets of eight and the subsets can be processed sequentially. This level of processing would not use parallelism.

Figure 11:
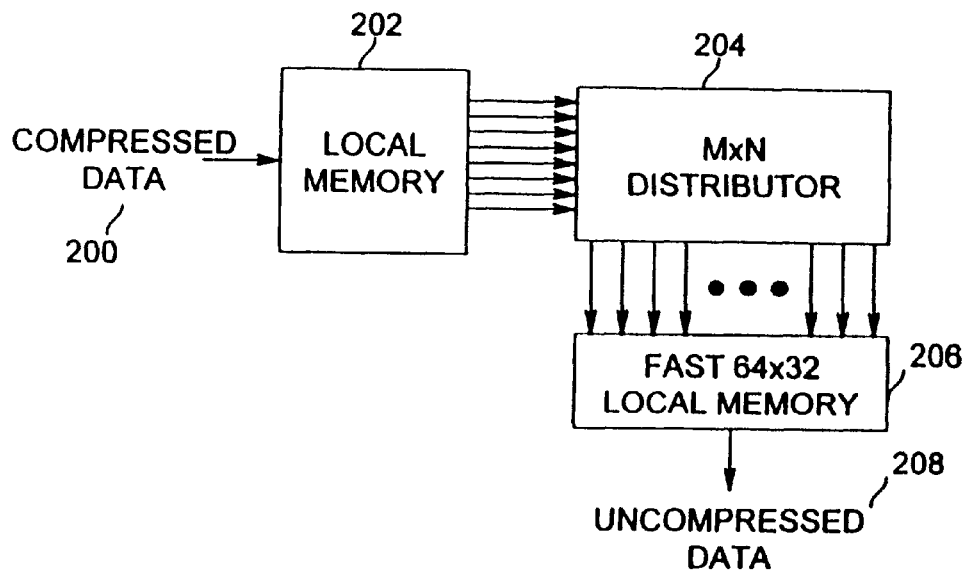
FIG. 11 is a block diagram of decompression circuitry.

FIG. 11 is a block diagram of decompression circuitry. Compressed data 200 is stored in a Local Memory 202. The Local Memory passes compressed data across M input lines to at least one MxN distributor 204, where the input/output matrix is formed by shift operations on the data. No addition or multiplication operations are required, and no floating point numbers are being manipulated. The MxN distributor

204 transfers all of the data from the M inputs to the respective N outputs, and into a Fast 64x32 Local Memory 206. Uncompressed data 208 is read out of the Fast 64x32 Local Memory for further processing, such as display of the uncompressed image on a computer monitor.

Accordingly, the present invention provides a method for compressing and decompressing graphics image data. Although this invention has been described in certain specific embodiments, many additional modifications and variations would be apparent to those skilled in the art. It is therefore to be understood that this invention may be practiced otherwise than is specifically described. Thus, the present embodiments of the invention should be considered in all respects as illustrative and not restricted, the scope of the invention to be indicated by the appended claims rather than the foregoing description. The invention has been described in its presently contemplated best mode, and it is clear that it is susceptible to various modifications, modes of operation and embodiments, all within the ability and skill of those skilled in the art and without the exercise of further inventive activity. Accordingly, what is intended to be protected by Letters Patent is set forth in the appended claims.

APPENDIX A

```
//T3p23456.cpp VERSION 04/23/1999
//FMI.3D-Multimedia. Architectural group. A.Ostrovsky.
//FMI propriatory Compression/Decompression algorithms. CONFIDENTIAL
#define UC unsigned char
#define ULI unsigned long int
#define FL float
int WorkBits; float Fde;
int Packpoint(UC* ActualARGB, UC* PackedARGB, int Bits)
//Res: 4 color packed components starting from PackedARGB
{ULI r=0, w; int k;
if(Bits==4) {PackedARGB[0]=ActualARGB[1]/16*16 + ActualARGB[0]/16;
        PackedARGB[1]=ActualARGB[3]/16*16 + ActualARGB[2]/1 ;}
        //Result takes 2 bytes
if (Bits==6)
(for(k=0;k<4;k++){w=ActualARGB[k]/4; w<<=(k*6); r|=w;}
        //we get: r=(Byte3=0, Byte2,Byte1,Byte0).
for(k=0;k<3;k++)PackedARGB[k]=*((UC*)&r+k);) //Result takes 3 bytes
if(Bits==8) (for)k=0;k<4;k++)PackedARGB(k)=ActualARGB[k];
                //Result takes 4 bytes
return Bits/2;}
//.........................................................................
int DM(int M)
{int p;
if(M<=64)p=6; if(M<=32)p=5;if{M<=16)p=4;
if(M<=9)p=3;if(M<=4)p=2;if{M<=2)p=1;return p;}
//.........................................................................
//After compression through Comp23456( ):
//Output=
//(M=NumberOfColors,
//{A(0),R(0),G(0),B(0), A(1),R(1),G(1),B(1), . . . ,A(M-1),R(M-1), (M-1),B(M-1)},
//{w0,w1,w2,w3, . . . , w63}.
//
//The color quadruplets ARGB's are represented like before
//        (4 components may take 2, 3, 4 bytes).
//The elements wk represent color numbers for the pixels 0, 1, 2, . . . , 63.
//The number of bits d required for each wk depends on M=NumberOfColors.
//If M<=64, d=6.
//If M<=32, d=5. If M<=16, d=4. If M<=8, d=3. If M<=4, d=2.
If M<=2, d=1.
//There is one exception: like before, if M=1, we use 5-Bytes representation.
int Comp23456(UC* Input,UC* Output)//VERSION: 04/23/1998
//Output: {NumbOfColors, M ARGB-groups, packed 64 indices}.
{UC *S; UC Q[256]; UC I[64];
int jb; UC u1=1, u254=254;//u1={00000001}, u254={11111110} .04/23 1998
ULI g[4]; int u,a,b,c,d,i,j,k,p,q,M,R,X,z,z4,D; ULI eps2,n2; floa h;
ULI va; UC vb,vc;
BOOL hu,li,Lossless=0; UC *ps, *qs; S=Input; g[0]=g[1]=g[2]=g[3]= ; short int V[64];
if {WorkBits==8 && Fde==0) Lossless=1;
for{k=0;k<64;k++)V[k]=k*k; .//In HW-implementation squarer-device are used
for{j=0;j<4;j++)//we determine the total brightness n2:
{for(k:0;k<64;k++)g[j]+:S[k*4+j]; g[j]/=64;}n2=g[0]*g[0]+g[1]*g [ ]+g[2]*g[2];
X=n2;
if{X<10000)z=2200-X/8;//we compute eps2:
else {if(X<40000)z=950-(X-10000)/64; else z=481-(X-40000)/256;} i: (z<0)z=0; z+=20;
//Now: considering Fde: we compute z*Fde
z4=z/4; z=z*2; h=(FL)2.0;//z*Fde: May be implemented in a variery of ways. . .
for(k=0;k<7;k++){if{Fde<h){z-=z4;h-=(FL)0.25;}}
if(WorkBits==6)z/=4;if (WorkBits==8)z/=16;eps2=(ULI) z; if(Lossless eps2=0;
//We form I[64]: a set of indices indicating color ordinals for every pixel:
S=Input; I[0]=0;p=1; for(k=0;k<4;k++)Q[k]=S[k];
for(i=1;i<64;i++)
{hu=0;
for(j=0;j<p;j++)
{li=0; va=0;
```

APPENDIX A-continued

```
for(q=0;q<4;q++)
{vb=abs(Q[j*4+q]-S[i*4+q]);
if{!Lossless) {vc=vb>>2; va+=V[vc];} else va+=vb;}//end q-loop
it{!Lossless)va<<=4;
//The shifts >>2 and <<2 are to give an opportunity for having a -inputs squarer
if(va<=eps2)li=1; if(1i) {I[i]=j;hu=i;goto er;}
}//end j
er: if(!hu){for(k=0;k<4;k++)Q[p*4+k]=S[i*4+k]; p++;I[i]=p-1 ;}
}//end i
M=p;//<- number of different colors
d=DM(M);
D=1+M*WorkBits/2+8*d;
if(D>255||M>16)//No compression. The Barrier 16 is requested by hardware level.
{a=0; j=1;
if(WorkBits==8)j=0; jb=j;
for(i=0; i<64;i++)
{Packpoint(&S[a],&Output[j],WorkBits); a+=4; j+=WorkBits/2;}
if(WorkBits<8) Output[0]=0;
if(WorkBits==8)Output[1]=Output[1] | ul;
return jb=64*WorkBits/2;}
if(M==1|WorkBits==2)//Only one color case
{for(k=0;k<4;k++)Output[k+1]=g[k]; Output[0]=1;
if(WorkBits==8)Output[1]=Output[1] & u254; return 5;}
//General case:
//Now: we merely send packed ARGB's, and after that:
//we sequentually take each I[k], 0<=k<=63, convert it into d-bit representation,
//and send.
a=0; b=1;
for(j=0;j<M;j++){PackPoint(&Q[a],&Output[b],WorkBits); a+=4; b+:WorkBits/2; }
q=b;u=k=R=0; d=DW(M); ps=(UC *)&c;
Beg: c=0;*ps=I[k]; k++; c<<=u; R|=c; u+=d;
if(u>=8||(k==64){qs=(UC *)&R; Output[q]=*qs; q++;R>>=8; u-=8;}
if(k<64)goto Beg;
Output[0]=M;
if(WorkBits==8)Output[1]=Output[1] & u254; return D;}
//.................................................................
```

APPENDIX B

```
void UnpackPoint(UC* PackedARGB, UC* ResultARGB,int Bits)
//Result: 4 color components ResultARGB [0], [1], [2], [3]
{int k,d; ULI mask,r; UC c,bask; ULI p; UC * u; UC * v;
if(Bits==4)//PackedARGB= (4*4)=16 bits) = (2 bytes)
{bask=0xF0;
for(k=0; k<4; k++)
{d=k/2; c=PackedARGB[d];if)k% 2==0)c=c<<4; else c=c&bask; ResultA GB[k]=c+7;
if(k==3 && (255-ResultARGB [k] <9))ResultARGB [k]=255;
                //<- if alpfa is close to 255, we make it 255.
                                                        }
                                                        }//end 4
if(Bits==6)//PackedARGB= (6*4=24 bits) = (3 bytes)
{mask=0x3F; d=24;
for(k=0; k<4; k=++)
{u=(UC* )&p; v=PackedARGB;
*u=*v;u++;v++;
*u=*v;u++;v++;
*u=*v;u++;v++; *u=0;
r=p;r&=mask;r<<=d;c=* ((UC *)&r+3);ResultARGB [k]=c*4+ 1;
if(k==3 & &(255-ResultARGB [k] <3 ))ResultARGB [k] =255;
//<- if alpfa is close to 255, we make it 255.
mask<<=6;d-=6;}          }//end 6
if(Bits==8)//PackedARGB= (8*4)=32 bits) = (4 bytes)
{for(k=0;k<4;k++)ResultARGB[k]=PackedARGB[k];}//end 8
}
//.................................................................
int Decomp23456(UC* Input,UC* Output)
{int a,b,M,j,d,u=0,v=0,k,c=0,K; UC w; UC t[6]; UC *ps, *qs, *qsl;
int Er,bj; UC u1=1;
t[0]= 1 ;t[1]=3;t[2]=7;t[3]= 15 ;t[4]=31 ;t[5]=63;//<- masks
M=Input[0]; b=1;
if(WorkBits==8)//spec.case: we check LS-bit in Input[1]
{Er=Input[1] & ul; if(Er==1) {M=0;b=0;} }
bj=b;
if(M==0)//The case without compression (start index for Input is indicated by the 'b')
{a=0;
for(j=0;j<64;j++)
```

APPENDIX B-continued

```
{UnpackPoint(&Input[b],&Output[a],WorkBits); a+=4; b+=WorkBits/2; }
return bj +64* WorkBits/2;}
if(M==1)for(j=0;j<64;j++){for(a=0;a<4;a++){Output[j*4+a]=Input[a+1 ];} }return 5;)
b=1+M*WorkBits/2;
d=DM(M); j=0; K=8*d; qs=(UC* )&c; qs1=qs+1; k=b;
//Here: we just unpack ARGB's
// and send them to their places indicated by wk, 0<=k<=63.
Nach: if(k-b>=K) return (1+M*WorkBits/2+8*d);
ps=(UC* )&Input[k]; *qs=*ps; ps++; qs1=*ps; k++;
Beg: c>>=u; v+=d; w=*qs; w&=t[d-1];
//0<=j<=63: pixel, w: it's color number
UnpackPoint(&Input[ 1 +w* WorkBits/2],&Output[4*j],WorkBits); j++;
if(v>=8){v-=8; u=v; goto Nach;} u=d; if(j<64)goto Beg; return 77;
//..........................................................................
```

What is claimed is:

1. A computer-implemented method of compressing graphics image data into at least one compressed block comprising the steps of:
   (A) reading a block of graphics image data, the block having a plurality of pixels, each of the plurality of pixels having a color represented by red, green, blue, and intensity values;
   (B) computing an epsilon value for the block, the epsilon value for the block being based on an attribute of the block;
   (C) mapping a color ordinal number to each pixel in the block by identifying a distinct color of the pixel based on the epsilon value and assigning to the pixel a corresponding color ordinal number, each color ordinal number representing one of the distinct colors present in the pixels of the block;
   (D) storing the red, green, blue, and intensity values of each distinct color present in the block into the compressed block; and
   (E) storing the color ordinal number mapped to each pixel in the block into the compressed block.

2. The computer-implemented method of claim 1, wherein the epsilon value is based on a total brightness of the block.

3. The computer-implemented method of claim 2, wherein, the total brightness of the block is based on an average of the red, green, and blue values of all the pixels in the block.

4. The computer-implemented method of claim 1, further comprising the steps of:
   (A) calculating a work bit value representing a number of significant bits for each red, green, blue, and intensity values;
   (B) calculating a quality level value representing a desired level of quality of graphics image data; and
   (C) further adjusting the epsilon value based on the work bit value and quality level value.

5. The computer-implemented method of claim 1, wherein the epsilon value equals zero.

6. The computer-implemented method of claim 1, further comprising the steps of:
   repeating steps (A)–(E) for all blocks of graphics image data.

7. The computer-implemented method of claim 1, further comprising the step of:
   storing a number representative of the distinct colors present in the block into the compressed block.

8. The computer-implemented method of claim 1, wherein the block of graphics image data has eight lines of pixels and eight columns of pixels, with the pixels located at the intersection of the rows and columns.

9. The computer-implemented method of claim 1, wherein two colors, a first color having a first red value, a first green value, a first blue value, and a first intensity value, and a second color having a second red value, a second green value, a second blue value, and a second intensity value, are distinct if after computing a sum of differences between the first red value and the second red value, the first green value and the second green value, the first blue value and the second blue value, and the first intensity value and the second intensity value, the sum of the differences is greater than the epsilon value.

10. The computer-implemented method of claim 1, wherein each red, green, blue, and intensity values are stored in the compressed block according to a work bit value, the work bit value determining a number of significant bits to be stored for each red, green, blue, and intensity values.

11. The computer-implemented method of claim 1, further comprising the step of:
   sequentially outputting each compressed block to a computer memory in a computer system.

12. In a computer system, an apparatus for compressing graphics image data into a compressed block, the graphics image data comprising a plurality of pixels, each of the plurality of pixels having a color represented by red, green, blue, and intensity values, the apparatus comprising:
   (A) means for computing an epsilon value for the block, the epsilon value for the block being based on an attribute of the block;
   (B) means for mapping a color ordinal number to each pixel in the block by identifying a distinct color of the pixel based on the epsilon value and assigning to the pixel a corresponding color ordinal number, each color ordinal number representing one of the distinct colors present in the pixels of the block;
   (C) means for storing the red, green, blue, and intensity values of each distinct color present in the block into the compressed block; and
   (D) means for storing the color ordinal number mapped to each pixel in the block into the compressed block.

13. A computer-implemented method of compressing graphics image data into at least one compressed block comprising the steps of:
   (A) reading a block of graphics image data, the block having a plurality of pixels, each of the plurality of pixels having a color represented by red, green, blue, and intensity values;
   (B) computing an epsilon value for the block, the epsilon value for the block being based on a total brightness of the block;

(C) mapping a color ordinal number to each pixel in the block by identifying a distinct color of the pixel based on the epsilon value and assigning to the pixel a corresponding color ordinal number, each color ordinal number representing one of the distinct colors present in the pixels of the block;

(D) storing the red, green, blue, and intensity values of each distinct color present in the block into the compressed block; and (E) storing the color ordinal number mapped to each pixel in the block into the compressed block.

14. The computer-implemented method of claim 13, wherein the total brightness of the block is based on an average of the red, green, and blue values of all the pixels in the block.

15. A computer-implemented method of compressing graphics image data into at least one compressed block comprising the steps of:

(A) computing a work bit value representing a number of significant bits for each red, green, blue, and intensity values;

(B) computing a quality level value representing a desired level of quality of graphics image data;

(C) reading a block of graphics image data, the block having a plurality of pixels, each of the plurality of pixels having a color represented by red, green, blue, and intensity values;

(D) computing a total brightness of the block, the total brightness of the block being based on an average of the red, green, and blue values of all the pixels in the block;

(E) computing an epsilon value for the block, the epsilon value for the block being based on the total brightness of the block;

(F) further adjusting the epsilon value based on the work bit value and quality level value;

(G) mapping a color ordinal number to each pixel in the block by identifying a distinct color of the pixel based on the epsilon value and assigning to the pixel a corresponding color ordinal number, each color ordinal number representing one of the distinct colors present in the pixels of the block;

(H) storing the red, green, blue, and intensity values of each distinct color present in the block based on the work bit value into the compressed block;

(I) storing the color ordinal number mapped to each pixel in the block into the compressed block;

(J) storing a number representative of the distinct colors present in the block, into the compressed block; and (K) repeating steps (C)–(J) for all blocks of graphics image data.

* * * * *